United States Patent
Tobita

(10) Patent No.: US 6,940,732 B2
(45) Date of Patent: Sep. 6, 2005

(54) SYNCHRONOUS RECTIFIER CIRCUIT

(75) Inventor: Atsuhiro Tobita, Hanno (JP)

(73) Assignee: Shindengen Electric Manufacturing, Co., Ltd., Tokyo (JP)

( * ) Notice: Subject to any disclaimer, the term of this patent is extended or adjusted under 35 U.S.C. 154(b) by 54 days.

(21) Appl. No.: 10/615,783

(22) Filed: Jul. 10, 2003

(65) Prior Publication Data
US 2004/0022076 A1 Feb. 5, 2004

(30) Foreign Application Priority Data
Aug. 1, 2002 (JP) ........................................ 2002-225079

(51) Int. Cl.$^7$ ............................................. H02M 3/335
(52) U.S. Cl. .................................................. 363/21.06
(58) Field of Search ........................... 363/21.06, 21.04, 363/131

(56) References Cited

U.S. PATENT DOCUMENTS

| | | | |
|---|---|---|---|
| 3,708,743 A | 1/1973 | Grangaard et al. | 323/22 SC |
| 4,087,703 A | 5/1978 | Akamatsu | 307/253 |
| 4,335,334 A | 6/1982 | Hosoya | 315/408 |
| 5,313,109 A | 5/1994 | Smith | 307/270 |
| 5,708,571 A | 1/1998 | Shinada | |
| 6,011,703 A | 1/2000 | Boylan et al. | |
| 6,038,143 A | 3/2000 | Miyazaki et al. | 363/19 |
| 6,108,219 A | 8/2000 | French | 363/23 |
| 6,137,695 A | 10/2000 | Takida et al. | 363/19 |
| 6,377,477 B1 * | 4/2002 | Xie et al. | 363/21.14 |
| 6,504,270 B1 | 1/2003 | Matsushita | 307/140 |
| 6,608,769 B2 | 8/2003 | Bergk | 363/21.17 |
| 2003/0210118 A1 | 11/2003 | Tobita | 336/173 |

FOREIGN PATENT DOCUMENTS

| | | |
|---|---|---|
| DE | 37 27 170 A1 | 2/1989 |
| JP | 9098569 | 4/1997 |
| JP | 10-136646 | 5/1998 |
| JP | 11-069803 | 3/1999 |
| JP | 11-262261 | 9/1999 |
| SU | 1762374 A1 | 9/1992 |

* cited by examiner

*Primary Examiner*—Shawn Riley
(74) *Attorney, Agent, or Firm*—Nixon & Vanderhye, PC

(57) ABSTRACT

There is provided a synchronous rectifier circuit that makes it possible to secure sufficient driving voltage for the rectifier switch regardless of the voltage of the secondary winding. In this synchronous rectifier circuit, the primary winding is insulated from the secondary winding and a rectifier switch is provided on the secondary side. An auxiliary switch, a diode, and an auxiliary winding are also provided on the secondary side. The emitter of the auxiliary switch and the cathode of the diode are connected to the gate of the rectifier switch. One end of the auxiliary winding is connected to the base of the auxiliary switch and the anode of the diode. An end of the secondary winding is collected to the collector of the auxiliary switch. The other end of the auxiliary winding is connected to this one end of the secondary winding.

5 Claims, 1 Drawing Sheet

1

SYNCHRONOUS RECTIFIER CIRCUIT

BACKGROUND OF THE INVENTION

1. Field of the Invention

The present invention relates to a synchronous rectifier circuit in which the primary side is insulated from the secondary side, and having a rectifier switch formed by an FET provided on the secondary side.

2. Description of the Related Art

FIG. 2 shows a conventional synchronous rectifier circuit. SW1 indicates a main switch. SW2 indicates a rectifier switch. SW3 indicates a commutating switch. T indicates a transformer. T1 indicates a primary winding of the transformer T. T2 indicates a secondary winding of the transformer T. L indicates an output choke. C indicates a smoothing capacitor. R indicates a resistor. The switches SW1, SW2, and SW3 of this conventional example are all formed by FETs. One end of the resistor R is connected to the gate of the rectifier switch SW2. The other end of this resistor R is connected to both the output choke L and one end of the secondary winding T2.

In the conventional synchronous rectifier circuit shown in FIG. 2, the resistor R is connected to the gate of the rectifier switch SW2, and the resistor R is connected to a connecting portion connecting the secondary winding of the transformer T and the output choke L. However, when the output voltage is low and the peak value of the secondary winding voltage of the transformer T is low, the problem arises that there is insufficient voltage to drive the rectifier switch SW2.

The present invention was conceived in view of the above problem and it is an object thereof to provide a new synchronous rectifier circuit that is not affected by the voltage of the secondary winding and in which the rectifier switch operates smoothly.

SUMMARY OF THE INVENTION

In order to solve the above problem and attain the object of the present invention, the synchronous rectifier circuit of the present invention is structured in the manner described below.

Namely, the synchronous rectifier circuit of the present invention comprises: a transformer that includes a primary winding, a secondary winding, and an auxiliary winding connected via one end the auxiliary winding to one end of the secondary winding, said transformer insulating a secondary winding side from a primary winding side; a diode connected via an anode to another end of the auxiliary winding; an auxiliary switch connected to said another end of the auxiliary winding via a resistor connected to a base, said auxiliary switch being connected to said one end of the secondary winding and to said one end of the auxiliary winding via a collector; and a rectifier switch connected via a gate to a cathode of the diode and to an emitter of the auxiliary switch, and via a drain to another end of the secondary winding.

In the synchronous rectifier circuit of the present invention, the auxiliary switch may be formed by a PNP transistor or a P-channel MOSFET.

In the synchronous rectifier circuit of the present invention, when the main switch is on, the gate of the rectifier switch is charged via the diode by voltage obtained by adding the voltage of the secondary winding to the voltage of the auxiliary winding. When the main switch is off, the commutating switch is turned on. Moreover, at this time, because the voltage of the auxiliary winding is inverted so as to become a negative potential, the auxiliary switch is turned on and the charge that had been charged to the gate of the rectifier switch is discharged to the output side. As a result, it is possible to secure sufficient driving voltage for the rectifier switch regardless of the voltage of the secondary winding.

DETAILED DESCRIPTION OF THE PREFERRED EMBODIMENTS

Figure 1:
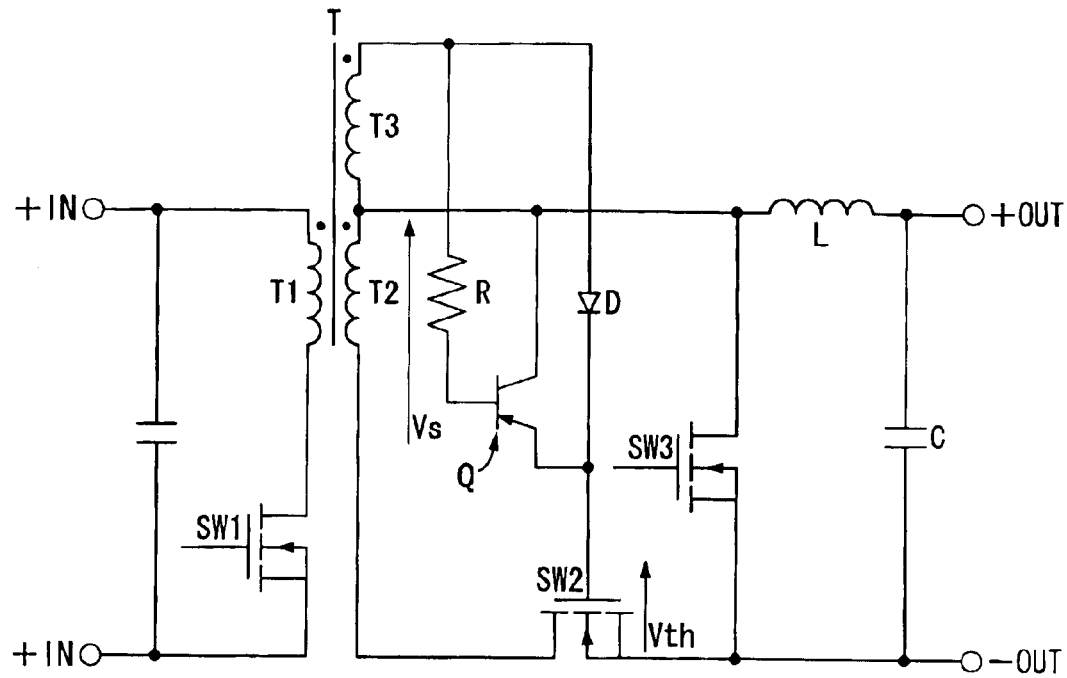
FIG. 1 is a circuit diagram showing an embodiment of the present invention.
Figure 2:
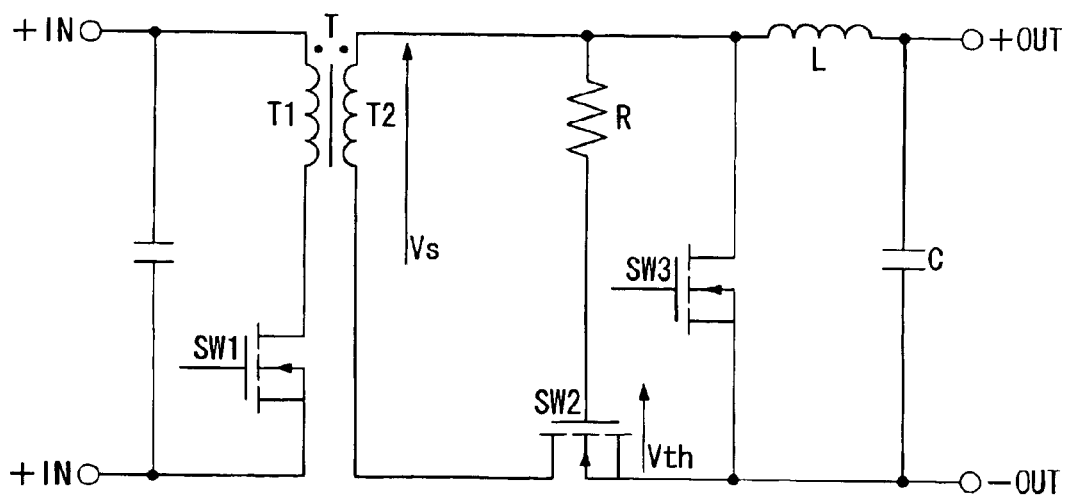
FIG. 2 is a circuit diagram showing a conventional example.

An embodiment of the synchronous rectifier circuit of the present invention will now be described using the attached drawings. FIG. 1 shows an embodiment of the synchronous rectifier circuit of the present invention. SW1 indicates a main switch. SW2 indicates a rectifier switch. SW3 indicates a commutating switch. T indicates a transformer. T1 indicates a primary winding of the transformer T. T2 indicates a secondary winding of the transformer T. T3 indicates an auxiliary winding of the transformer T. L indicates an output choke. C indicates a smoothing capacitor. R indicates a resistor. Q indicates an auxiliary switch. D indicates a diode.

In the synchronous rectifier circuit of the present embodiment, the transformer T provides insulation between the primary side and the secondary side. On the primary side this synchronous rectifier circuit is provided with the main switch SW1 formed by an FET, and on the secondary side with the rectifier switch SW2 and the commutating switch SW3 formed by FET. The output choke L is connected to one end of the secondary winding T2, while the drain of the rectifier switch SW2 is connected to the other end of the secondary winding T2. Moreover, in order to supplement the gate voltage insufficiency of the rectifier switch SW2, one end of the auxiliary winding T3 is connected to the relevant end of the secondary winding T2 of the transformer T. An auxiliary switch Q formed by a PNP transistor is provided on the secondary side of the synchronous rectifier circuit of the present invention. The emitter of the auxiliary switch Q is connected to the gate of the rectifier switch SW2. The base of the auxiliary switch Q is connected via the resistor R to the other end of the auxiliary winding T3 that is not connected to the secondary winding. The collector of the auxiliary switch Q is connected to one end of the secondary winding and the auxiliary winding. Furthermore, a diode D is provided on the secondary side, and the cathode of the diode D is connected to the gate of the rectifier switch SW2. The anode of the diode D is connected to the other end of the auxiliary winding T3.

The synchronous rectifier circuit of the present embodiment is structured in the manner described above. A description will now be given of the operation thereof. When the main switch SW1 is on, the gate of the rectifier switch SW2 is charged via the diode D by voltage obtained by adding the voltage of the secondary winding T2 to the auxiliary winding T3 of the transformer T.

When the main switch SW1 is off, the commutating switch SW3 is on. At this time, because the voltage of the auxiliary winding T3 is inverted to become a negative potential, the auxiliary switch Q is turned on and the charge charged to the gate of the rectifier switch SW2 is discharged.

Note that, in the present embodiment, the auxiliary switch is formed by a PNP transistor, however, substantially the same operation as that of the present embodiment is obtained when a P channel MOSFET is used. It is also possible to construct the synchronous rectifier circuit of the present invention using an NPN transistor or an N channel MOSFET for the auxiliary switch.

According to the present invention, when the main switch is on, the gate of the rectifier switch is charged via the diode by the voltage of the secondary winding and the voltage of the auxiliary winding. When the main switch is off, the commutating switch is turned on. Moreover, at this time, because the voltage of the auxiliary winding is inverted so as to become a negative potential, the auxiliary switch is turned off and the charge that had been charged to the gate of the rectifier switch is discharged. As a result, it is possible to secure sufficient driving voltage for the rectifier switch regardless of the voltage of the secondary winding.

If the auxiliary switch is formed by a PNP transistor or a P channel MOSFET, then the affects described above can be obtained using a simple structure.

What is claimed is:

1. A synchronous rectifier circuit, comprising:
   a transformer that includes a primary winding, a secondary winding, and an auxiliary winding connected via one end of the auxiliary winding to one end of the secondary winding, said transformer insulating a secondary winding side from a primary winding side;
   a diode connected via an anode to another end of the auxiliary winding;
   an auxiliary switch connected to said another end of the auxiliary winding via a resistor connected to a base, said auxiliary switch being connected to said one end of the secondary winding and to said one end of the auxiliary winding via a collector; and
   a rectifier switch connected via a gate to a cathode of the diode and to an emitter of the auxiliary switch, and via a drain to another end of the secondary winding.

2. The synchronous rectifier circuit according to claim 1, wherein the auxiliary switch is formed by a PNP transistor or a P-channel MOSFET.

3. A rectifier circuit, comprising:
   a transformer including a primary winding, a secondary winding, and an auxiliary winding having a first end coupled to a first end of the secondary winding, wherein the secondary winding side of the transformer is insulated from the primary winding side;
   a diode having an anode coupled to a second end of the auxiliary winding;
   an auxiliary switch having a control terminal coupled to the second end of the auxiliary winding via a resistor and a first switch terminal coupled to the first end of the secondary winding and to the first end of the auxiliary winding; and
   a rectifier switch having a gate coupled to a cathode of the diode and to a second switch terminal of the auxiliary switch, and a drain coupled to a second end of the secondary winding.

4. The rectifier circuit according to claim 3, wherein the auxiliary switch comprises a PNP transistor.

5. The rectifier circuit according to claim 3, wherein the auxiliary switch comprises a P-channel MOSFET.

* * * * *